United States Patent [19]

May et al.

[11] 4,016,710
[45] Apr. 12, 1977

[54] BAT SUPPORT SPIDER FOR A HARVESTER REEL

[75] Inventors: Donald L. May; Archie E. Neal, both of Garfield, Wash.

[73] Assignee: J. E. Love Company, Garfield, Wash.

[22] Filed: May 12, 1976

[21] Appl. No.: 685,717

[52] U.S. Cl. .................................................. 56/220
[51] Int. Cl.$^2$ ......................................... A01D 57/02
[58] Field of Search .............................. 56/219–227

[56] References Cited

UNITED STATES PATENTS

| | | | |
|---|---|---|---|
| 2,823,511 | 2/1958 | Beaty | 56/226 |
| 3,584,445 | 6/1971 | Hubbard | 56/220 |
| 3,667,198 | 6/1972 | Gibson | 56/227 |
| 3,771,299 | 11/1973 | Gradwohl et al. | 56/220 |

Primary Examiner—Russell R. Kinsey
Attorney, Agent, or Firm—Graybeal, Barnard & Uhlir

[57] ABSTRACT

A plurality of radial bat support arms are secured between two axially spaced apart hub plate members. The plate members form a hub assembly which is secured to radial mounting lobes on a thin walled center tube of a harvester reel. Each bat support arm has a base portion of channel form in cross section. A single bolt is used for connecting the web of such base portion directly to a first hub plate member. Two additional bolts extend through both hub plate members, through gusset portions of the support arm which lie against the second hub plate member, and through tubular spacer means positioned axially between the gussets and the first plate member. The two additional bolts are both circumferentially spaced apart and radially spaced inwardly from the single bolt. The hub plate members include spacer blocks welded to their inner surfaces at the regions thereof which outwardly bound the mounting lobes on the center tube.

4 Claims, 10 Drawing Figures

U.S. Patent   April 12, 1977   Sheet 1 of 3   4,016,710
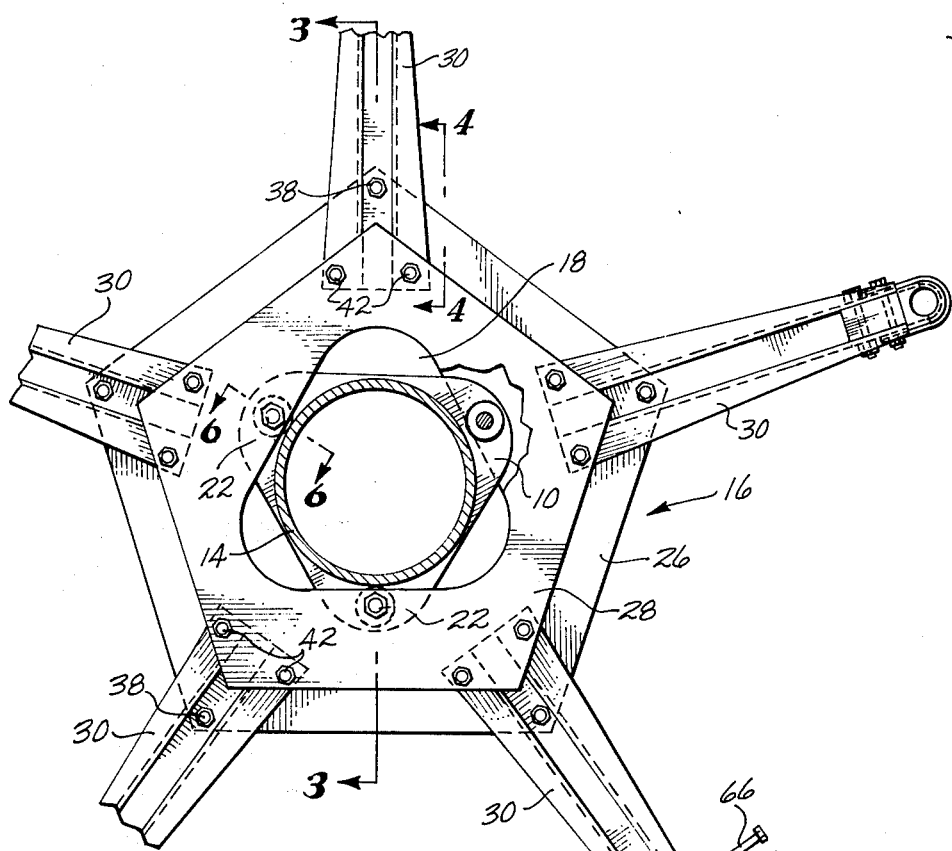
Fig.1
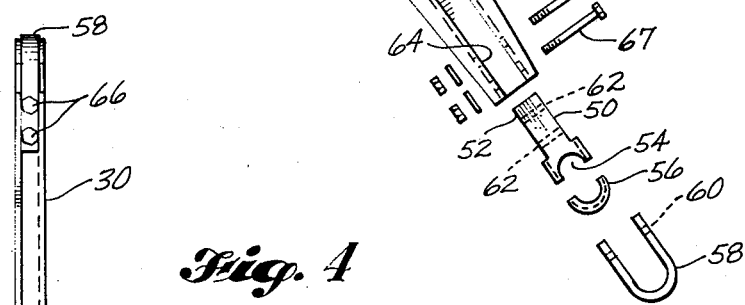
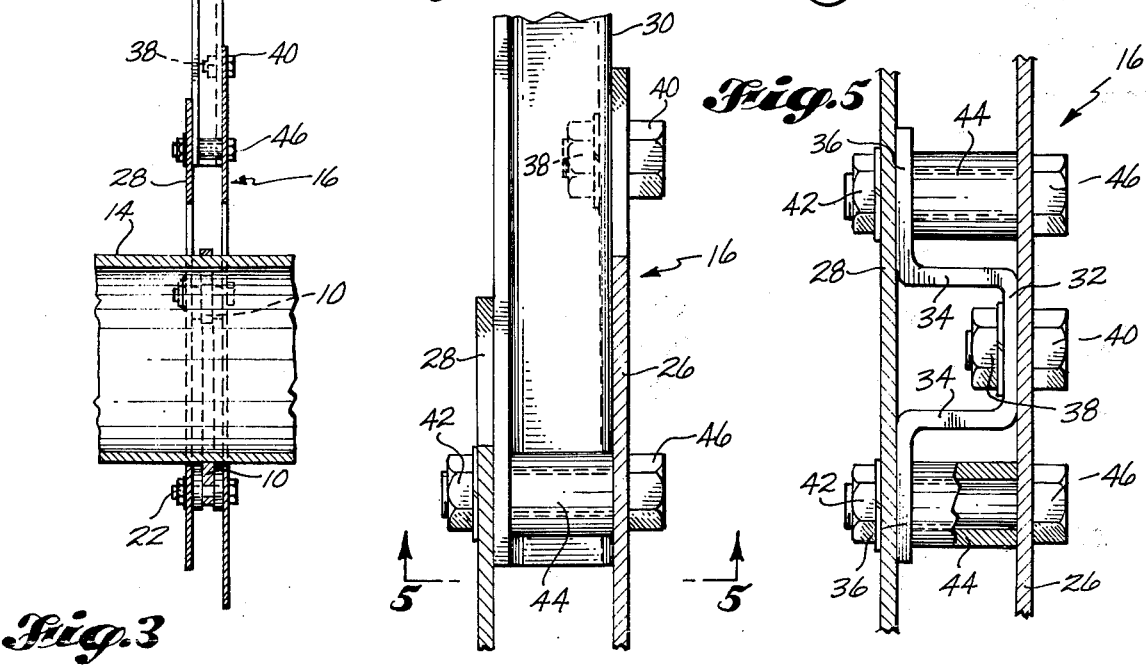
Fig.3   Fig.4
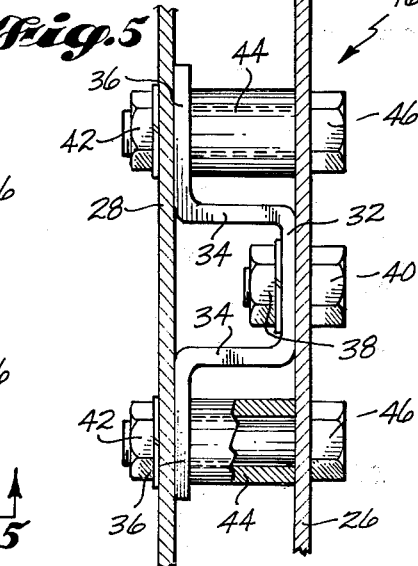
Fig.5

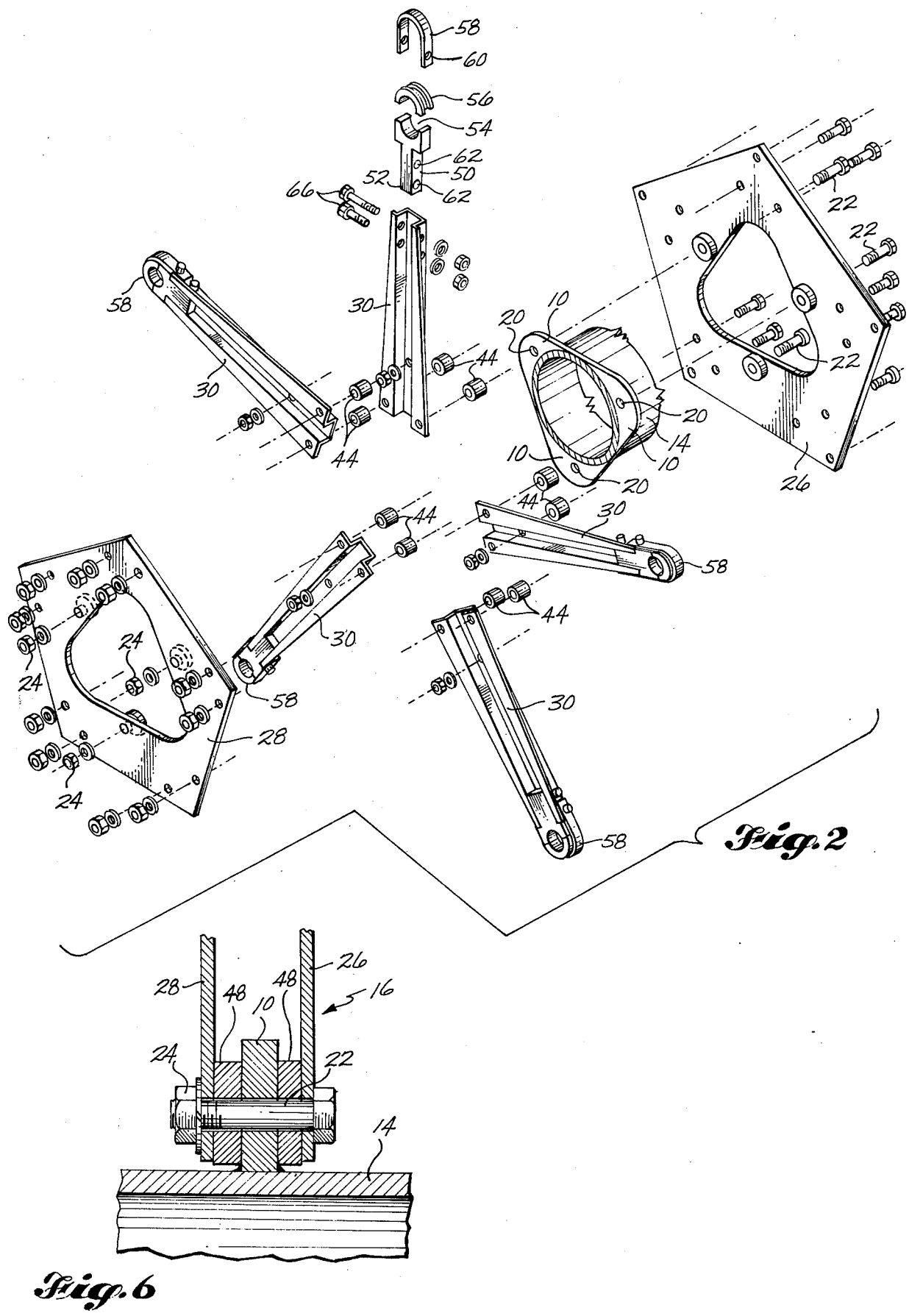

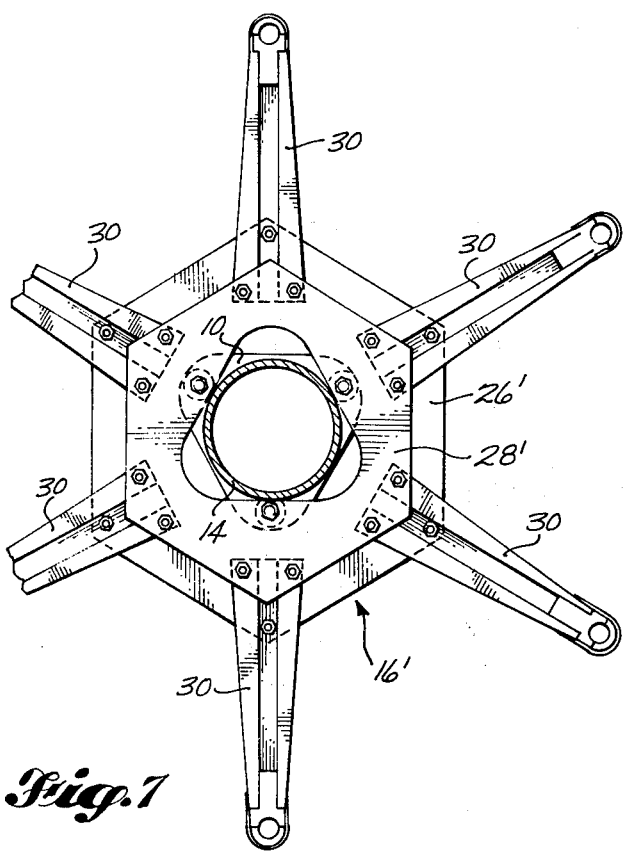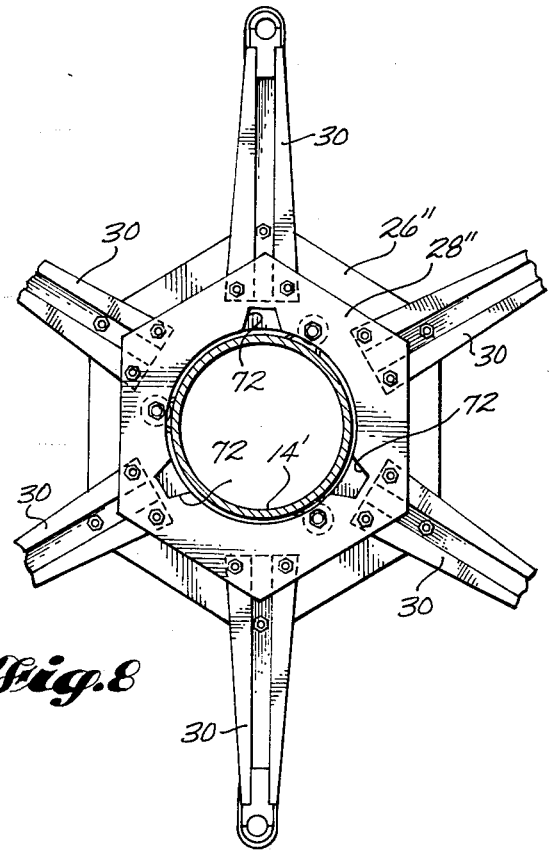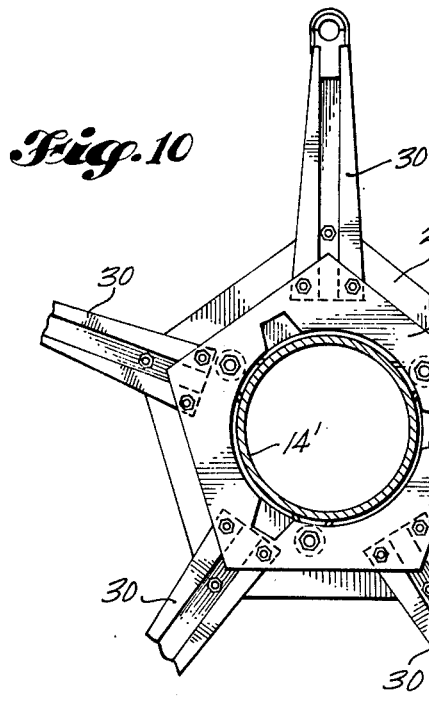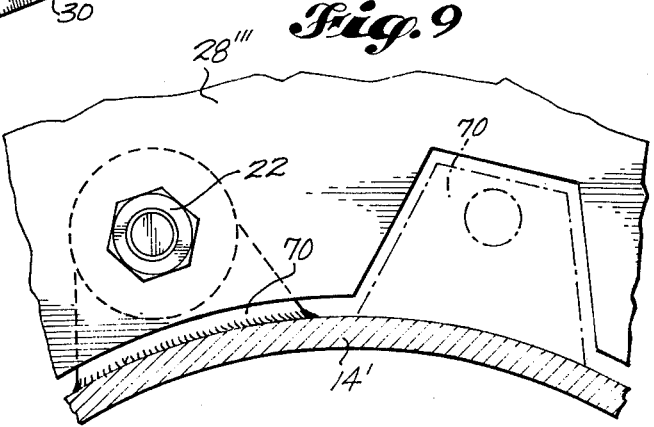

BAT SUPPORT SPIDER FOR A HARVESTER REEL

BACKGROUND OF THE INVENTION

1. Field of the Invention

The present invention relates to an improvement in harvester pick-up reels, and in particular to a simplified bat support spider capable of being easily repaired in the field by the farmer.

2. Description of the Prior Art

The bat support spider of this invention is an improved version of the bat support spider disclosed by U.S. Pat. No. 3,771,299, granted Nov. 13, 1973.

Pat. No. 3,771,299 discloses a bat support spider which includes a one piece hub which is cast from aluminum or the like. A problem of this construction is that the hub member cannot be easily repaired in the field because most farmers cannot weld aluminum. However, other features of the bat support spider construction disclosed by U.S. Pat. No. 3,771,299, such as the channel construction of the bat support arms, are desirable and are retained in the improved bat support spider of this invention.

Additional United States prior patents which should be examined for the purpose of putting the present invention in proper perspective with respect to the prior art are:

U.S. Pat. No. 2,823,511, granted Feb. 18, 1958, to Clarence E. Beaty;
U.S. Pat. No. 3,546,863, granted Dec. 15, 1970 to Thomas O'D. Connolly;
U.S. Pat. No. 3,550,366, granted Dec. 29, 1970, to Charles M. Gibson;
U.S. Pat. No. 3,584,445, granted June 15, 1971, to Steffan R. Hubbard;
U.S. Pat. No. 3,585,815, granted June 22, 1971, to Steffan R. Hubbard;
U.S. Pat. No. 3,667,198, granted June 6, 1972, to Charles M. Gibson; and
U.S. Pat. No. 3,698,166, granted Oct. 17, 1972, to Ivan E. Fisher.

Also, the several patents discussed in column one of the aforementioned U.S. Pat. No. 3,771,299 should be considered.

SUMMARY OF THE INVENTION

The bat support spider of this invention is characterized by a simplicity in construction, an increased fatigue life, and by being easily repairable in the field.

Bat support spiders according to the present invention are basically characterized by a hub assembly which comprises a pair of plate members which in use are spaced axially apart and extend radially of the center tube. A plurality of radial bat support arms are secured to each hub assembly. Each bat support arm includes a base portion of channel form in cross-section which is located between the plate members at a related corner portion of the hub assembly. The channel portion comprises a pair of radial gussets in coplanar parallelism, a radial web spaced axially from said gussets, and a pair of generally axially extending flanges interconnected between the web and the gussets. Considered by themselves the bat support arms may be essentially identical to the bat support arms disclosed by U.S. Pat. No. 3,771,299.

The web of each arm is contiguous one of the hub plate members and the gussets of such arm are contiguous the second hub plate member. A single bolt extends through the web and a radially outer portion of the first hub plate member. A pair of additional bolts extend through the gussets and the second hub plate member at locations spaced apart from each other circumferentially of the center tube and radially inwardly of the single bolt. Tubular spaces are located axially between the gussets and the first hub plate member and the two additional bolts extend through said tubular spacers.

The first hub plate member transmits torque from the center tube of the reel to the bat shafts. The second hub plate member provides a truss effect in the assembly to that side rigidity is maintained. The design provides adequate strength in all directions, minimum weight and is economical to manufacture. Further, the unit is more easily repaired in the field by the farmers and the construction increases the fatigue life of the reel.

A further advantage of the bat support spider construction of this invention is that it makes it possible to make bat support spiders for differing diameters of reel center tube which differ from each other only in the size of the two plate members. The remaining parts may be common for all sizes of reel. In the last several years the manufactures of the combine machines have been progressively increasing the size of the pick up reels. As the reels increase in length it is necessary to increase the diameter of the center tubes. The bat support spider of this invention makes the hub plate members the only two members which must be different from one reel to the next.

These and other objects, features and advantages will be apparent from the embodiments which are illustrated in the drawing and described below.

BRIEF DESCRIPTION OF THE DRAWING

In the drawing like letters and numerals refer to like parts, and:

FIG. 1 is an end elevational view of a spider assembly according to the present invention, with some parts broken away, and some parts shown exploded, for clarity of illustration;

FIG. 2 is an exploded isometric view of the spider assembly, including a fragmented portion of the center tube of a pick-up reel on which the spider assembly is mounted;

FIG. 3 is an axial sectional view taken substantially along line 3—3 of FIG. 1;

FIG. 4 is an enlarged scale view of a fragmented portion of FIG. 3, at the region where a bat arm is connected to the hub assembly;

FIG. 5 is a sectional view taken substantially along line 5—5 of FIG. 4;

FIG. 6 is an axial sectional view of a fragmented portion of the pick-up reel, at the location of a fastener for securing the hub assembly to a mounting flange carried by the center tube;

FIG. 7 is a view like FIG. 1, but of a modified form of spider assembly characterized by an additional bat support arm;

FIG. 8 is a view like FIG. 7, but of another modified form of spider assembly, characterized by a different form of apparatus for mounting the spider assembly onto the support tubes;

FIG. 9 is an enlarged scale fragmentary view taken at the region of one of the connectors; and FIG. 10 is a view like FIG. 1, but showing the type of mounting means included in the embodiment of FIG. 8.

DESCRIPTION OF THE PREFERRED EMBODIMENTS

A bat support spider of this invention is intended to be a replacement for, and/or be interchangeable with, a bat support spider shown by the aforementioned U.S. Pat. No. 3,771,299. Accordingly, the reel itself has not been redrawn and will not be redescribed, but rather that portion of U.S. Pat. No. 3,771,299 relating to the general make-up of the reel assembly is hereby incorporated herein by this specific reference to U.S. Pat. No. 3,771,299.

Referring now to FIGS. 1 and 2 of the drawing, a plurality of triangular hub plates 10 are secured to the center tube 14 of the pick-up reel at axially spaced apart locations. The number of hub plates 10 and their spacing depends on the size of the pick-up reel involved.

A bat support spider is associated with each hub plate 10. As best shown by FIG. 1, each hub assembly 16 includes a generally triangular shaped center opening 18 which is sized to be only slightly larger than the hub plate 10. The hub assemblies are moved onto the tube 14 by sliding them individually endwise relatively over the tube 14. The opening 18 in a given hub assembly 16 is aligned with a given hub plate 10 and is then moved axially so as to move the hub plate 10 relatively through the opening 18 until it is within the inner space of the hub assembly 16. Then, in the illustrated embodiment, the hub assembly is rotated 60° to place aperatures 20 formed in the lobe portions of plate 10 into alignment with related aperatures formed in mounting portions of the members which make up the hub assembly 16. Then, bolts 22 are inserted through the aperatures and nuts 24 are installed and tightened to make a firm connection. As best shown by FIG. 6, when the hub assembly 16 is installed it is tight against a lobe portion of its hub plate 10.

According to the present invention, each hub assembly 16 comprises a pair of axially spaced apart plate members 26, 28. In the embodiment of FIGS. 1–6 each plate member is in the form of a pentagon and each includes a generally triangular shaped central opening 18 which is alignable with the opening 18 in the other member.

An elongated bat support arm 30 is associated with each corner portion of the hub assembly 16. The arms 30 and the hub plate members 26, 28 together form the "spider".

The number of bat support arms 30 may vary. The embodiments shown by FIGS. 1–6 and by FIG. 10 comprise five arms 30 and hence the plate 26, 28 and 26''', 28''' are each made in the shape of a pentagon. The embodiments of FIGS. 7 and 8 include six arms and the plates 26', 28' and 26'' and 28'' are each made in the shape of a hexagon.

Each bat support arm 30 includes at least a base portion which is of channel shape in cross section, reinforced by a pair of gussets. Each arm 30 includes a radial web 32, a pair of flanges 34, and a pair of gussets 36. The base portion of an arm 30 is located between the two plates 26, 28 at each corner portion of the hub assembly 16. The web 32 extends radially and is set against the first plate member 26. The gussets 36 also extend radially and they are set against the second plate 28. The flanges extend generally axially of the reel and are interconnected between the web 32 and the gussets 36.

A single bolt 38 extends through aligned openings in the web 32 and the adjacent corner portion of plate 26. The head of the bolt 38 may be located within the channel of the arm and a nut 40 may be applied to it on the opposite side of plate 26, for removably securing the web 32 to the plate 26.

A pair of bolts 42 may be used for securing the gussets 36 to both plates 26, 28. As best shown by FIGS. 1 and 3–5, a tubular spacer 44 is snugly received within the space between each gusset 36 and the hub plate member 26. The bolts 42 may extend through aligned openings in plate 28 and gussets 36, then through the tubular spacers 44 and then through another co-axial opening in hub plate member 26. Nuts 46 are connected to the outwardly projecting end portion of the bolts 42, for removably securing the bolts 42 in place.

As shown by FIGS. 1, 3 and 4, the location of the bolts 42 are spaced apart from each other on a chord with respect to the center of the reel, and are spaced radially inwardly from the bolt 38. This three point connection of the arms 30 to the hub plate members 26, 28 provides a quite strong and stable connection in all directions.

As best shown by FIGS. 2 and 6, a plurality of spacer blocks 48 are welded to the inner surfaces of the hub plate members 26, 28 at those regions which include an opening for a fastener bolt 22. The spacer blocks 48 are of a thickness to snugly fill the spaces which exist axially outwardly of the aperature lobes of the mounting plate 10, between such plate 10 and the hub plate members 26, 28.

The outer end of each arm 30 is provided with an end clamp assembly of the type disclosed by U.S. Pat. No. 3,771,299. Specifically, each end clamp assembly comprises a bearing base 50 having a shank portion 52 snugly fittable in the channel formed between the flanges 34 of the arm section 30. Base 50 also includes an outer end portion having an outwardly directed semi-cylindrical recess 54. A half ring section 56 carrying a complementary semi-cylindrical recess is relatable with the base 50 to define an axially extending circular opening. Base 50 and member 56 may be made from nylon, for example. A U-shaped metal clamp member 58 fits over member 56 and includes a pair of openings 60 in its side portions which are alignable with one of a pair of passageways 62 formed in the shank portions 52 of base 50. These passageways 62 are also alignable with paired openings 64 formed in the outer end portions of the arm sections 30. As shown in FIG. 1, bolt members 66, 67 extend through the openings and passageways when the block 50, the member 56 and the clamp 58 are assembled on arm section 30.

The embodiments of FIGS. 8–10 show a slightly modified form of mounting lobe. In these embodiments the lobes are individual members (rather than corner portions of a single member) which are individually welded onto the reel tube 14. The individual lobes 70 may vary in size with the diameter of the center tube 14. As shown by FIGS. 8 and 10, when the individual lobes 70 are used, the central openings through the hub plate members include a main circular portion conforming to the outer diameter of the reel tube 14, and radial cut-out portions corresponding to the lobes 70. As in the case of the earlier embodiment, mounting portions of the hub assembly are provided between adjacent lobes and spacer blocks 48 are provided at the regions where the lobes are bolted to the plates 26, 28. The spider assembly is positioned on the center tube 14 by aligning the notches 72 in the hub plate members 26, 28 with the lobes 70. The spider is then moved axially until the lobes 70 are located in the space between the plates 26, 28. Then, the spider is rotated until the attachment holds through lobes 70 are in alignment with the attachment hose through the plates 26, 28 and the spacer blocks 48 secured thereto.

The bat support spider construction of this invention maintains the side rigidity and other mechanical advantages of the form of spider disclosed by U.S. Pat. No. 3,771,299. But in addition, it provides a unit which is more easily repaired in the field by the farmer and which includes an increased fatigue life. The hub plate member 26 transmits the torque from the reel tube 14 to the bat shaft support arms 30. The second hub plate member 28 provides a truss effect in the assembly so that side rigidity is maintained. The design provides adequate strength in all directions, with minimum weight, and is economical to manufacture.

What is claimed is:

1. A bat support spider for a harvester reel of a type comprising an elongated thin walled center tube of substantial diameter having good resistance to bending and mounting means for the bat support spider comprising a plurality of radial mounting lobes spaced apart circumferentially about the tube, to which the bat support spider is attached, said bat support spider comprising:

a hub assembly comprising first and second hub plate members together forming a plurality of corner portions, said hub plate members extending radially of the center tube and being spaced apart axially when in use:

a plurality of radial bat support arms equal in number to said corner portions, each said bat support arm having a base portion of channel form in cross section comprising a pair of radial gussets in coplanar parallelism, a radial web spaced axially from said gussets, and a pair of generally axially extending flanges interconnected between the web and the gussets, with the base portion of each said bat support arm being located between the first and second plates at a related corner portion, and said first hub plate member being contiguous the web of the arm and the second hub plate member being contiguous the gussets of said arm; and fastener means for connecting said arms to said first and second hub plate members, comprising bolt fastener means extending through the web of each arm and the first hub plate member at the related corner portion, and additional bolt means extending through both hub plate members and the arm gussets at locations radially inwardly of the first bolt means, and tubular spacer means for each said additional bolt means, positioned to substantially fill the axial space between the first hub plate member and the gussets, through which the second bolt means extends.

2. A bat support spider according to claim 1, wherein said hub assembly is formed to include a non-circular central opening including lobe portions which are axially alignable with the mounting lobes on the center tube, said opening being sized to pass said mounting lobes when said opening lobe portions are axially aligned therewith, and said hub plate members including mounting portions located between said opening lobe portions which are positionable axially outwardly of said mounting lobes upon rotation of said hub plate members relative to the center tube after said central opening has been aligned with said mounting lobes and said hub assembly has been moved axially an amount sufficient to position the mounting lobes axially between the two hub plate members, and wherein said hub plate members include spacer blocks welded to the inner surfaces thereof at said mounting portions, said spacer blocks being of an axial dimension so as to snugly fit between the mounting lobes and the hub plate members, with axially aligned openings being formed through each mounting portion, including through said spacer members, which openings are alignable with similar bolt receiving openings formed in the mounting lobes of the center tube, so that a bolt may be set through all of the aligned openings and a nut attached thereto for detachably securing the hub assembly to the center tube.

3. A bat support spider according to claim 1, wherein the second plate member terminates at each corner portion at a location spaced radially inwardly from the location of the fastener means which extends through the web of each bat support arm and the first plate member.

4. A bat support spider according to claim 3, wherein said hub assembly is formed to include a non-circular central opening including lobe portions which are axially alignable with the mounting lobes on the center tube, said opening being sized to pass said mounting lobes when said opening lobe portions are axially aligned therewith, and said hub plate members including mounting portions located between said opening lobe portions which are positionable axially outwardly of said mounting lobes upon rotation of said hub plate members relative to the center tube after said central opening has been aligned with said mounting lobes and said hub assembly has been moved axially an amount sufficient to position the mounting lobes axially between the two hub plate members, and wherein said hub plate members include spacer blocks welded to the inner surfaces thereof at said mounting portions, said spacer blocks being of an axial dimension so as to snugly fit between the mounting lobes and the hub plate members, with axially aligned openings being formed through each mounting portion, including through said spacer members, which openings are alignable with similar bolt receiving openings formed in the mounting lobes of the center tube, so that a bolt may be set through all of the aligned openings and a nut attached thereto for detachably securing the hub assembly to the center tube.

* * * * *